United States Patent [19]
Schultz et al.

[11] Patent Number: 4,763,266
[45] Date of Patent: Aug. 9, 1988

[54] AIRCRAFT FLIGHT COMMAND AND DISPLAY SYSTEM

[75] Inventors: Larry R. Schultz; Peter J. Super, both of Auburn; Francis J. van Leynseele, Edmonds, all of Wash.

[73] Assignee: The Boeing Company, Seattle, Wash.

[21] Appl. No.: 453,433

[22] Filed: Dec. 27, 1982

[51] Int. Cl.[4] .............................................. G06F 15/50
[52] U.S. Cl. .................... 364/433; 364/428; 364/435; 340/968; 73/178 T; 244/181
[58] Field of Search ............. 364/433, 434, 427, 428, 364/435; 73/178 T; 244/177, 180, 181; 340/968, 969, 970, 949

[56] References Cited

U.S. PATENT DOCUMENTS

| | | | |
|---|---|---|---|
| 3,618,002 | 11/1971 | Stinson | 244/184 |
| 3,860,800 | 1/1975 | Simpson | 364/430 |
| 4,021,010 | 5/1977 | Bliss | 364/428 |
| 4,129,275 | 12/1978 | Gerstine et al. | 244/181 |
| 4,189,118 | 2/1980 | Peter-Contesse | 244/182 |
| 4,319,219 | 3/1982 | Rein-Weston | 340/968 |
| 4,326,253 | 4/1982 | Cooper et al. | 364/428 |

*Primary Examiner*—Parshotam S. Lall
*Assistant Examiner*—Thomas G. Black
*Attorney, Agent, or Firm*—James P. Hamley; B. A. Donahue

[57] ABSTRACT

A system particularly adapted for guiding aircraft through wind shear conditions includes: a thrust command control (10) for maintaining airspeed and groundspeed within a defined range; a detection system (12) for detecting and annunciating the presence of moderate and severe wind shear; and a pitch command system (14) which provides pitch command signals for optimum climb out from a wind shear condition.

19 Claims, 5 Drawing Sheets

AIRCRAFT FLIGHT COMMAND AND DISPLAY SYSTEM

BACKGROUND OF THE INVENTION

The present invention pertains to the aircraft flight control art and, more particularly, to a means for enhancing flight operation in the presence of wind shear.

Takeoff or approach maneuvers under wind shear conditions significantly increase the complexity of proper aircraft flight. To aid the pilot during wind shear conditions, several flight control systems have been developed in the prior art. These systems have taken the form of wind shear detectors, which simply annunciate the condition of wind shear, or flight control systems which guide the pilot through wind shear.

Prior flight control systems have exhibited shortcomings in that they fail to provide one or more of the following features:
- a command and display system which may be easily integrated into existing aircraft;
- a continuous system for approach, takeoff and go-around;
- vertical compensation as well as horizontal compensation for thrust modulation used on approach;
- two levels of warning to alert the pilot of moderate and severe wind shear, which levels are dependent upon available performance in the event a go-around is required; and
- a go-around pitch command utilizing optimal performance of the airplane.

SUMMARY OF THE INVENTION

It is an object of this invention, therefore, to provide an improved aircraft flight command system which is particularly adapted for indicating and controlling flight through wind shear.

Briefly, according to the invention, an aircraft flight command system includes a thrust command which is operable during an aircraft approach maneuver for producing a thrust command signal adapted to control aircraft thrust to compensate for aircraft deviations from both a horizontal and a vertical predetermined approach profile. A wind shear detector, with indicating means, produces a warning signal in response to detecting that the aircraft is flying in a performance-limiting wind shear condition. Preferably, the wind shear detector has warning logic means for producing first and second level warning signals. A pitch command means is operable during aircraft go-around and takeoff maneuvers for producing a pitch command signal adapted to produce optimum aircraft climb under wind shear conditions.

DETAILED DESCRIPTION OF THE PREFERRED EMBODIMENTS OF THE INVENTION

Figure 1:
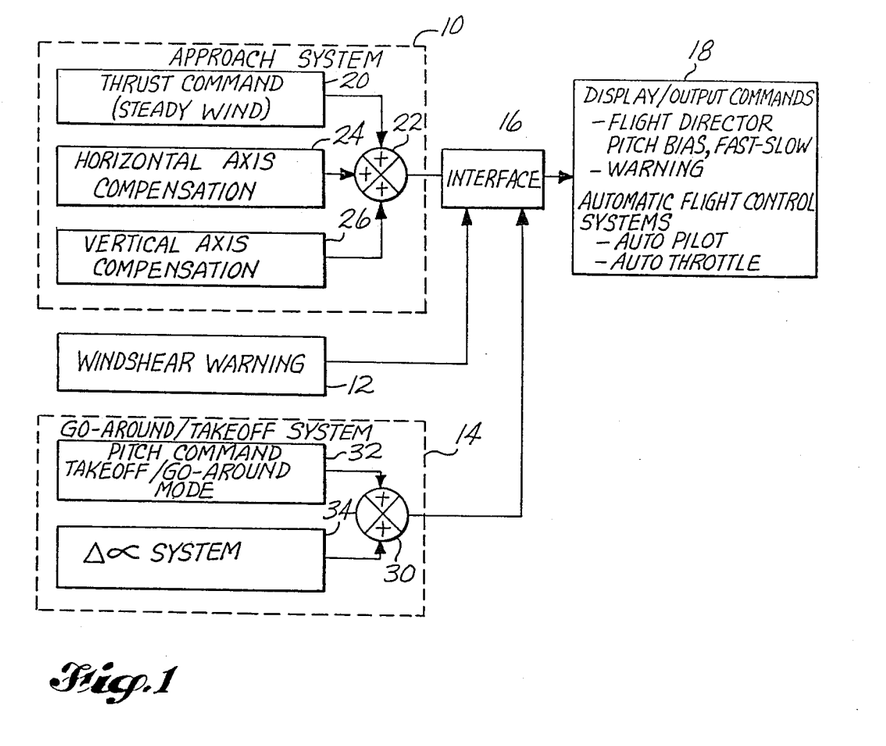
FIG. 1 is a block diagram illustrating the approach command control system, the wind shear warning and annunciating system, and the go-around/takeoff pitch command system, according to the invention.

FIG. 1 is block diagram illustrating the subsystem components to the overall aircraft flight command and display system. The subsystems include an approach system 10, a wind shear warning system 12 and a go-around/takeoff system 14. These systems 10, 12 and 14, as is described hereinbelow, provide control and/or annunciating information through an interface device 16 to the aircraft display and output command systems 18. The displays include the conventional flight director as well as oral or visual warning indicators. Command signals from the subsystems 10, 12 and 14 may, also, be routed directly to conventional automatic flight control systems including the autopilot and autothrottle.

Figure 2:
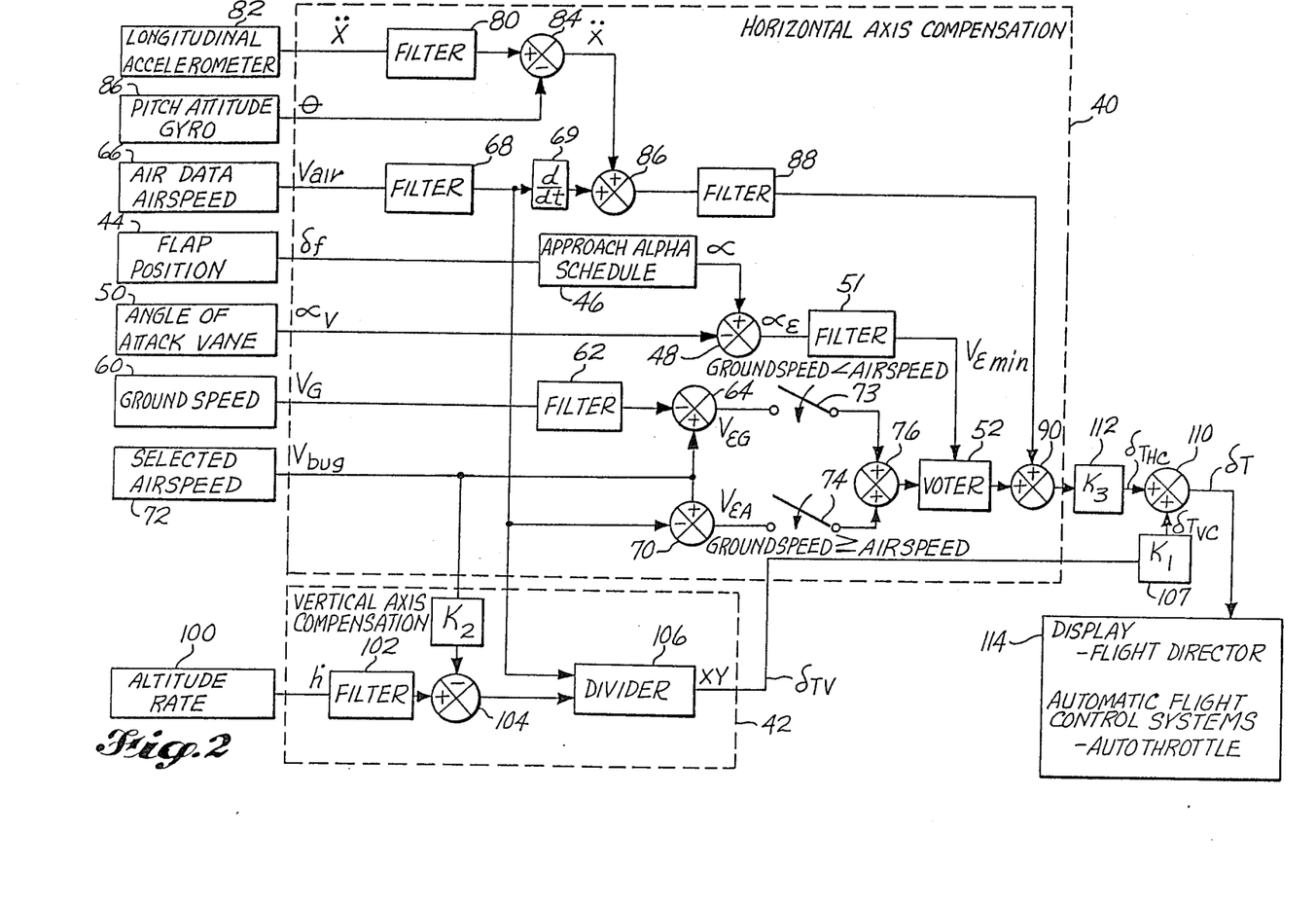
FIG. 2 is a detailed block diagram illustrating the preferred embodiment of the approach command system as shown in FIG. 1.

The approach system 10, as is more fully described with respect to FIG. 2, provides a thrust command signal for guiding the aircraft during an approach maneuver. The approach system 10 includes apparatus 20 which produces a thrust command signal appropriate to guide the aircraft during an approach maneuver, which signal assumes a steady ambient wind condition. Added to this signal, in an adder 22, are the outputs from horizontal axis compensating means 24 and vertical axis compensating means 26. The horizontal and vertical compensating means 24, 26, respectively, produce error signals corresponding to the deviation of the aircraft from its desired approach profile. These deviations are normally the result of wind effects such as wind shear. By providing a thrust correction signal to compensate for both horizontal and vertical deviations, it has been found that the present system provides significantly improved approach profile control over prior systems using only horizontal axis compensation.

Figure 3:
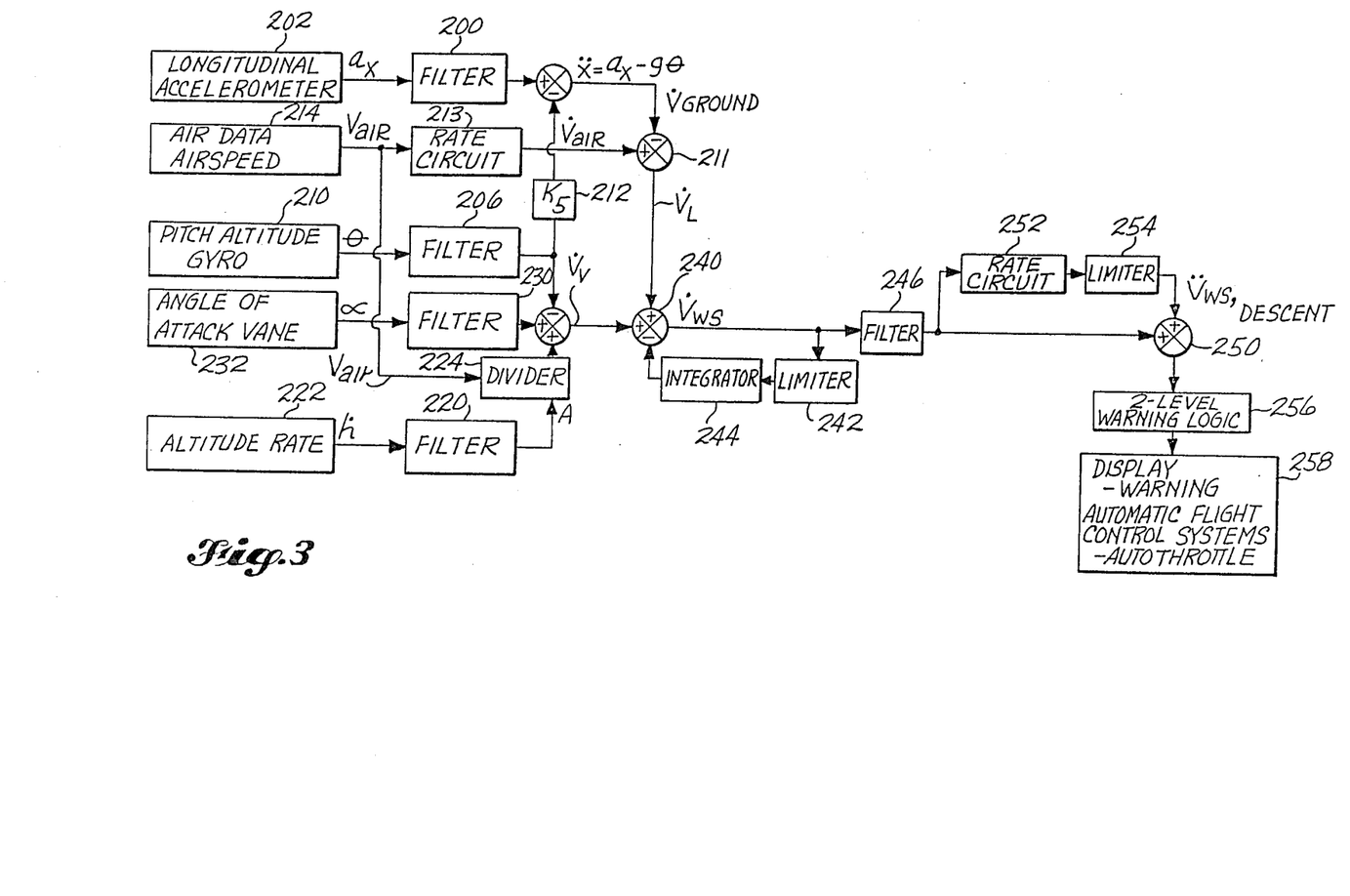
FIG. 3 is a detailed block diagram illustrating the preferred embodiment of the wind shear detecting and annunciating system, as shown in FIG. 1.

The wind shear warning system 12, in a manner more fully described with respect to FIG. 3, detects the presence of ambient wind shear or high turbulence. A two-level warning is provided. Thus, a first level indicates to the flight deck that the aircraft is in a wind shear but that the aircraft is fully capable of continuing on the approach maneuver. In the second level warning, the flight deck is advised that the wind shear is severe to the point that a go-around maneuver is advised.

Figure 4A:
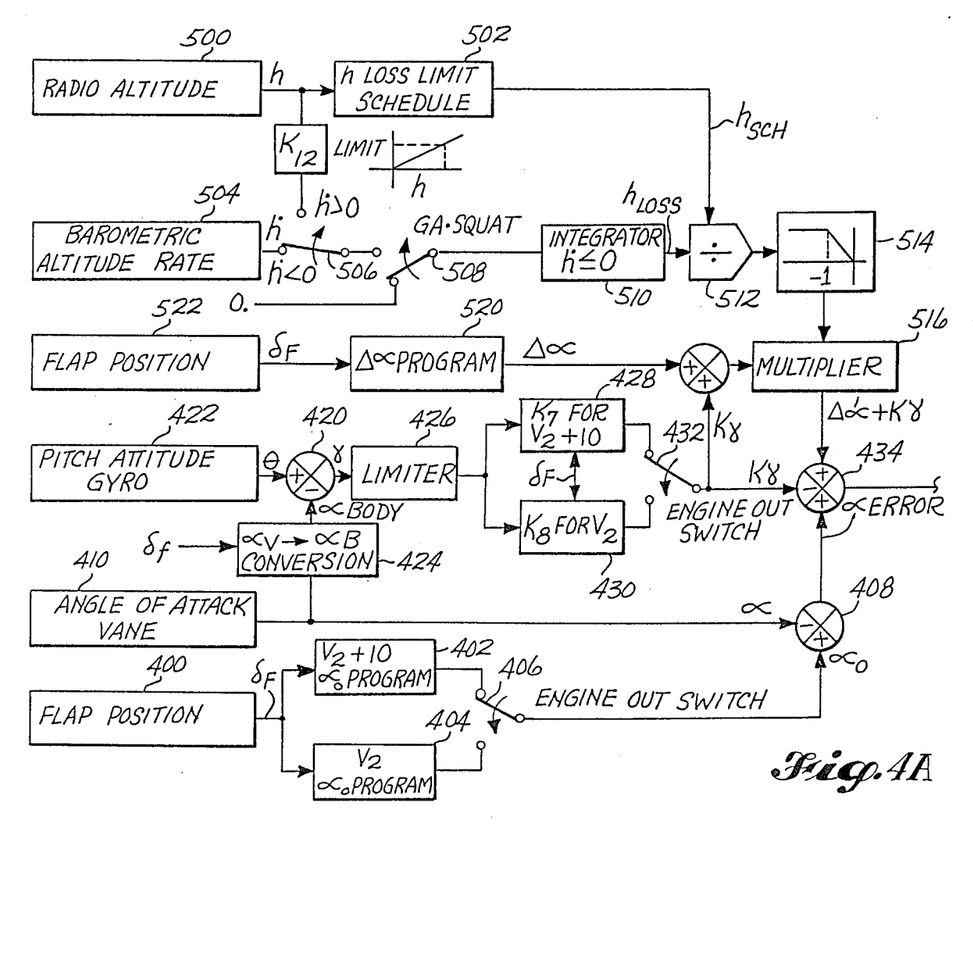
FIGS. 4A, 4B are detailed block diagrams illustrating the preferred embodiment of the go-around/takeoff pitch command system, as illustrated in FIG. 1.
Figure 4B:
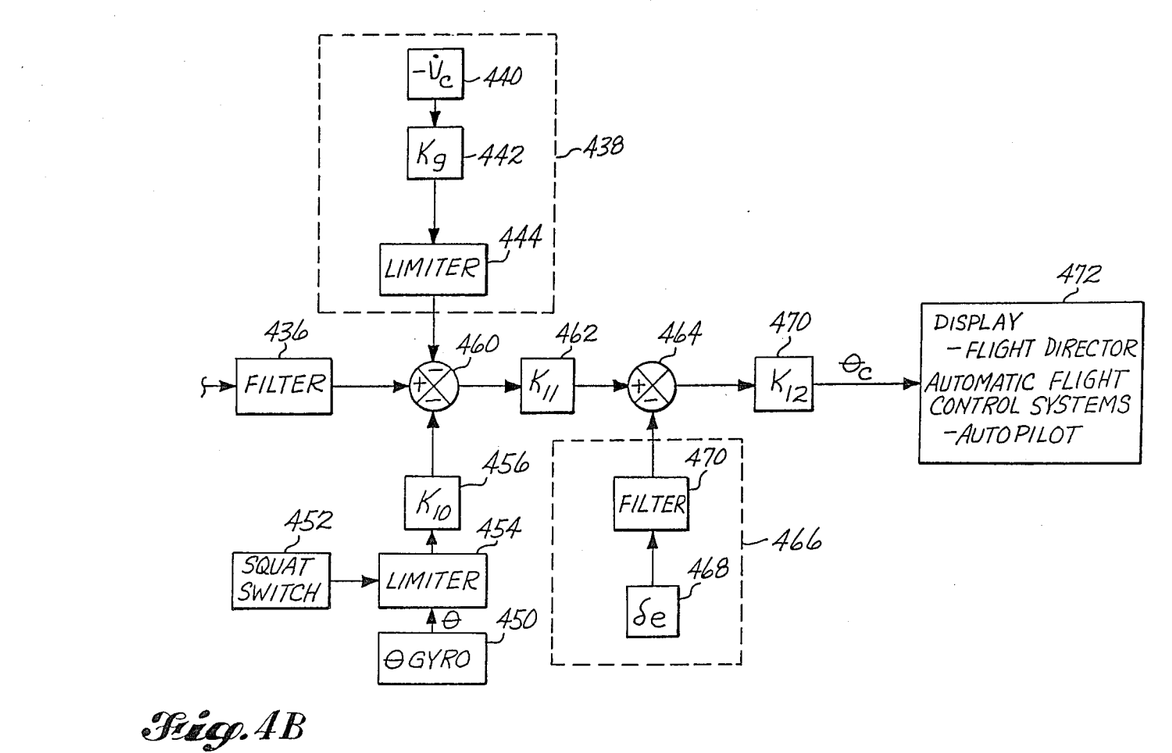

The go-around/takeoff system 14, which is fully described with respect to FIGS. 4A, 4B provides an output pitch command signal for control of the aircraft during a go-around or takeoff maneuver. This pitch command signal is produced as the sum, in summer 30, of a pitch command signal produced by the pitch command takeoff/go-around mode means 32 and the $\Delta\alpha$ means 34. Pitch command means 32 produces an output commanded angle of attack signal which is pre-programmed as a function of flap position and engine condition. The means $\Delta\alpha$ 34 produces a correction angle of attack signal, which correction signal is a programmed function of altitude and altitude loss. The $\Delta\alpha$ system produces the signal such that, at lower altitudes, less altitude loss is permitted. Thus, the go-around/takeoff system 14 provides an output pitch command signal which safely and precisely guides the aircraft in its go-around, or takeoff maneuver, particularly during wind shear conditions.

FIG. 2 is a detailed block diagram of the approach system 10 as shown in FIG. 1. This system produces a thrust command signal which is capable of commanding aircraft thrust such that the aircraft flies a predetermined approach profile despite the presence of wind shear conditions. This is accomplished by producing a component of the thrust command which corrects for horizontal deviations of the aircraft from the desired profile, in block 40, and a component which corrects for vertical deviations of the aircraft from the desired profile, in block 42.

The horizontal axis compensating means 40 monitors a signal $\delta_f$ representing flap position, as provided by conventional flap-positioning sensors 44, and, via a pre-programmed schedule 46, produces an output angle of attack signal $\alpha$ which is a pre-programmed function of flap position. In one application of the invention, the signal $\alpha$ corresponds to 1.3 $V_s$, where $V_s$ is the aircraft's stall speed. This signal $\alpha$ is independent of ambient wind conditions.

The scheduled angle of approach signal $\alpha$ is compared, in a combiner 48, with a signal $\alpha_v$, provided by conventional angle of attack vane 50, thereby producing a signal $\alpha_\epsilon$ equal to the error in angle of attack of the aircraft from its scheduled value. The signal $\alpha_\epsilon$, as processed through a gain filter 51, becomes a signal $V_{\epsilon min}$ corresponding to the error in the aircraft's speed from a scheduled, wind independent, value. This signal is passed to a voter 52.

The groundspeed signal $V_G$ provided by conventional groundspeed determining means 60 is filtered through a noise filter 62 and applied as one input to a combiner 64.

A signal $V_{air}$, provided by conventional air data airspeed means 66, is filtered by a noise filter 68 and applied as one input to a combiner 70.

Applied to the remaining inputs of the combiners 64, 70 is a $V_{bug}$ signal which is pilot-selected by conventional means 72. Thus, the output from the combiner 64 is a signal $V_{\epsilon G}$, corresponding to the difference between the pilot-selected value $V_{bug}$ and the actual groundspeed filtered value $V_G$. The output from combiner 70 is a signal $V_{\epsilon A}$ corresponding to the difference between the pilot-selected value $V_{bug}$ and the aircraft's actual filtered airspeed $V_{air}$.

A pair of switches 73, 74 passes a selected one of the $V_{\epsilon G}$, $V_{\epsilon A}$ signals to a summer 76 under appropriate conditions. Thus, if airspeed exceeds groundspeed, switch 73 closes, thereby routing the $V_{\epsilon G}$ signal to summer 76. Otherwise, the $V_{\epsilon A}$ signal is passed to summer 76 via closed switch 74. In this way, the switches 73, 74 assure that both airspeed and groundspeed are maintained above the desired $V_{bug}$ level.

Voter 52 selects the higher of the selected $V_{\epsilon G}$, $V_{\epsilon A}$ signal and the $V_{\epsilon min}$ signal. In so doing, the voter 52 prevents the aircraft from ever flying at a speed less than the scheduled stall speed as determined by $V_{\epsilon min}$.

The aircraft experiences speed variations when it is forced to fly a glide path under moderate or severe wind shear conditions. Thus, the horizontal axis compensation circuitry 40 provides speed compensation to correct for the effect of unsteady airmass. These variations from the trimmed speed might foster phugoid oscillations. A phugoid damping signal is created by noise filtering, in filter 80, the output signal $\dot{X}'$ provided by a conventional longitudinal accelerometer 82. Subtracted from this signal, in combiner 84, is a signal $\Theta$ representing aircraft pitch, as provided by conventional pitch attitude gyro 86. Thus, the output from combiner 84 is a signal $\dot{X}$ representing the aircraft's true longitudinal acceleration.

The signal $\dot{X}$ combined in combiner 86 with the $V_{air}$ signal provided by the air data airspeed means 66 noise filtered in 68 and differentiated in differentiator 69. The resultant signal out of combiner 86 is passed through a complementary filter 88, thereby producing the phugoid damping signal which is summed with the output from voter 52 at a combiner 90.

The vertical axis compensating means 42 evolved as the result of an analysis of the equations of motion showing that monitoring the effects of airmass variations by measuring groundspeed alone is insufficient to provide adequate compensation for vertical deviations in the aircraft's glide path. Thus, this compensation means provides an increment in thrust command required to overcome the effects of downdrafts (or updrafts) on the aircraft's ability to maintain a steady glide path.

Hence, a signal $\dot{h}$, provided by an aircraft's conventional altitude rate means 100, is noise filtered by filter 102 and applied as one input to a combiner 104. Coupled to the negative input of combiner 104 is the selected airspeed signal $V_{bug}$ amplified by a predetermined factor $K_2$. The resultant signal from the combiner 104 is divided, in a divider 106, by the filtered $V_{air}$ signal. The output from divider 106 is, therefore, an additional thrust command signal $\delta T_V$, where:

$$\delta T_V = (\dot{h} - K_2 V_{bug})/V_{air}.$$

This signal, after being amplified by a gain block 107 having a gain factor $K_1$, which was selected as a scaling factor to sum the vertical axis compensation is combined in combiner 110 with the scaled horizontal axis compensation, provided by gain block 112 having a gain factor $K_3$.

Thus, the output from combiner 110 is a total thrust command signal $\delta T$ which may be routed to the aircraft's display system, such as the flight director and/or the automatic flight control system in the form of the autothrottle, as indicated at block 114.

The system of FIG. 2, therefore, is a comprehensive aircraft thrust command system which compensates for vertical deviations of the aircraft from a desired glide path profile. In addition, this system compensates for wind shear conditions in the horizontal axis by maintaining the aircraft's groundspeed and airspeed at or above a pilot-selected value.

FIG. 3 is a detailed block diagram of the wind shear detecting and warning system 12, as shown in FIG. 1.

This system detects the condition of wind shear by monitoring both longitudinal and vertical axes components of wind velocity. The longitudinal component is determined by noise filtering, in filter 200, the longitudinal acceleration signal $a_x$ provided by a conventional longitudinal accelerometer 202. Acceleration effects due to aircraft pitch are subtracted at combiner 204 by noise filtering, at 206, the output signal $\Theta$ from the pitch attitude gyro 210, and multiplying the filtered signal by a gain factor $K_5$, at amplifier 212 where $K_5$ is selected to be equal to the acceleration due to gravity, g.

Thus, the output from combiner 204 is the longitudinal acceleration signal $\dot{X} = \dot{V}_{ground}$ which is equal to $a_x - g\Theta$.

The $\dot{V}_{ground}$ signal is subtracted, at combiner 211, from a signal $\dot{V}_{air}$, which signal is derived by taking the first time differential, in rate circuit 213, of the $V_{air}$ signal provided by a conventional air data airspeed means 214.

The output from combiner 211 is, therefore, a signal $V_L$ which is representative of the longitudinal component of wind acceleration.

The vertical component of wind is determined by noise filtering, at 220, the altitude rate signal $\dot{h}$, as provided by conventional altitude rate sensing means 222. The filtered signal is divided by the signal $V_{air}$, as provided by air data airspeed means 214, in a divider 224.

The output from divider 224 is applied as one input to combiner 226.

Also applied as inputs to combiner 226 are the pitch attitude gyro signal $\Theta$, as filtered through filter 206, and a signal $\alpha$, as noise filtered through filter 230, which is provided by a conventional angle of attack vane 232.

The combiner 226 sums the various input signals in the sense indicated to produce a signal $\dot{V}_V$ which is representative of the vertical component of ambient wind, i.e.

$$\dot{V}_V = g[(\Theta - \alpha) - (\dot{h}/V_{air})].$$

The longitudinal and vertical wind component signals $\dot{V}_L$, $\dot{V}_V$, respectively, are summed in a combiner 240 to produce a resultant wind shear signal $\dot{V}_{WS}$. Also applied, as an input to combiner 240, in the negative sense, is a limited, in limiter 242, and integrated, in integrater 244, form of the signal $\dot{V}_{WS}$, which acts as a washout filter to eliminate steady state error signals which may be present in the system.

The total wind shear signal $\dot{V}_{WS}$ is filtered by filter 246 to separate random turbulence from wind shear.

The output from filter 246 is passed both to a combiner 250 and to the input of a rate circuit 252. Rate circuit 252 takes the first time differential of the signal out of filter 246. A limiter 254 passes only that portion of the signal produced by the rate circuit 252 which corresponds to a negative, or descent, component, $\dot{V}_{WS}$, descent. Thus, the output from combiner 250 is a signal which is the sum of the total wind shear measurement $V_{WS}$ and a component representing rate of change of $V_{WS}$ in the descent direction.

This resultant signal is sent to a two-level warning logic system 256. The two-level warning logic system 256 responds to the warning signal produced by the combiner 250 to produce a first, or "yellow" warning annunciation in the event that the warning signal exceeds a first predetermined level. This first level corresponds to a wind shear condition which is high but within the capabilities of the aircraft to continue its landing maneuver. In the event that the warning signal provrded by combiner 250 exceeds a second predetermined level, corresponding to a wind shear condition which would tax the capabilities of the aircraft, a "red" warning is given indicating the need for a go-around maneuver.

The warning logic signals provided by logic 256 are passed to the flight deck warning systems and, if necessary, to the automatic flight control systems, such as the autothrottle control, as indicated at block 258.

The system of FIG. 3, therefore, determines the total ambient wind shear component by summing longitudinal and vertical wind shear components. A warning signal is developed, using both the wind shear signal and descent rate of change of the wind shear measurement. This warning signal is passed to a two-level warning logic block which indicates the severity of the wind shear compared to the capabilities of the aircraft.

FIGS. 4A, 4B illustrate, in detailed block diagram form, the preferred embodiment of the pitch command system 14 as shown in FIG. 1. This system is operable in takeoff and go-around maneuvers to produce optimum climb of the aircraft, particularly in windshear and turbulent conditions.

Conventional flap sensors 400 produce an output signal $\delta_F$ representative of flap position. These signals are passed to $\alpha_0$ programs 402, 404. Each of the programs 402, 404 stores a scheduled $\alpha_0$ as a function of flap setting. The value of $\alpha_0$ is derived from aerodymic performance data and is particular to each aircraft model. A switch 406 normally couples to the output from program 402, which commands the speed of $V_2 + 10$. In the event of an engine out, the switch 406 switches to the output from program 404 which schedules a speed of $V_2$.

The switch 406 selected output from either program 402 or program 404 is routed to combiner 408 having, as an additional input, a signal $\alpha$ as provided by a conventional angle of attack vane 410. The output from combiner 408 is, thus, a signal $\alpha_{ERROR}$, representative of angle of attack error from the scheduled value.

Flight path angle $\gamma$ is obtained at the output of combiner 420 by taking the difference between an attitude signal $\Theta$, as provided by a conventional pitch attitude gyro 422, and the aircraft's angle of attack $\alpha_{BODY}$, as converted through vane to body conversion 424 having flap position $\delta_F$ as an input.

The flight path angle signal $\gamma$ is passed through a limiter 426 which passes only positive values of $\gamma$. The signal is then passed to the input of gain blocks 428, 430, having gain factors of $K_7$, $K_8$, respectively. The values of $K_7$ and $K_8$ are derived for a particular airplane and are synthesized from aerodynamic performance data. Both values vary as a function of flap position. A switch 432 selects the output from gain block 428 for normal aircraft operation, but in the event that an engine is out, switch 432 selects the output from gain block 430. Thus, the signal passed through switch 432 is of the general form $K\gamma$. This signal is summed in the negative sense with the $\alpha_{ERROR}$ signal as provided at the output from combiner 408 in combiner 434. Also summed in combiner 434 is a $\Delta\alpha'$ signal as will be described hereinbelow.

The output from combiner 434 is passed to a filter 436 (FIG. 4B) which reduces noise content.

Operation in a turbulent environment excites the airplane fundamental rigid body longitudinal frequencies. For that reason, phugoid and short period damping signals must be added to the command signal.

Phugoid damping compensation signals are provided by the system shown generally in block 438. Here, a signal $-\dot{U}_C$ at 440 represents longitudinal acceleration complemented with airspeed. This signal may be obtained from the output of filter 51 in FIG. 2.

The signal $-\dot{U}_C$ is scaled by a predetermined factor $K_9$ at 442 and passed to limiter 444. Limiter 444 is designed to prevent the system from commanding a pitch up that would cause the airplane to exceed load factor limits.

Protection against overrotation of the aircraft upon takeoff is provided by passing a signal $\Theta$ representing pitch attitude from gyro 450, and a signal from squat switch 452 representing the status of load on the landing gear to a limiter 454. As pitch angle increases and the aircraft is still on the ground, there is danger of striking the tail on the runway. When the aircraft becomes airborne, as detected by the switch 452, limiter 454 is inhibited. A gain factor $K_{10}$ at 456 provides scaling prior to passing the output from limiter 454 to a combiner 460 along with the output from the phugoid compensation system 438, and the command signal as provided out of filter 436.

The command signal output from combiner 460, after being scaled by a factor $K_{11}$ at 462, is combined in a combiner 464 with the output from the short period damping system, indicated generally at 466. For particular aircraft, a transfer function may be derived for damping with a signal proportional to elevator position. Thus, elevator position, as provided at 468, is passed through filter 470 to produce the appropriate short term damping compensation signal which is then coupled to combiner 464.

The resultant signal from combiner 464 is scaled by a factor $K_{12}$ at 470 and is then passed, as a pitch command signal $\Theta_C$, to the aircraft display and control systems, indicated generally at 472. Thus, the signal may be used to activate the pitch command bars of the flight director display and/or it may be passed to the autopilot system for automatic control of the aircraft.

Returning to FIG. 4A, research has shown that when strong wind shear interferes with the normal rate of climb, the climbout based upon pitch attitude consistent with a speed $V_2+10$ must be abandoned for steeper pitch attitude consistent with maximum practical angle of attack. The below-described portion of the pitch control system implements this requirement.

The signal h, as produced by a conventional radio altitude block 500, is passed to an h loss limit schedule 502. The schedule 502, having a transfer as indicated, produces a signal $h_{SCH}$ which represents the maximum allowable altitude loss limit as a function of aircraft altitude.

The aircraft's actual measured altitude loss is calculated by passing the output signal conventional barometric altitude rate block 504 through switches 506, 508 to an integrator 510. Switch 506 is provided to gradually reduce the added amount of $\Delta\alpha$ command once the aircraft has achieved a positive rate of climb. The $\Delta\alpha$ signal is removed at a rate proportional to radio altitude and determined by gain $K_{12}$.

Switch 508 provides a zero level signal to the input of integrator 510 unless the pilot has commanded a go-around maneuver and the squat switch indicates that the aircraft is off the ground.

Integrator 510 produces an output signal $h_{LOSS}$ representative of altitude loss. This signal is divided, in divider 512, by the loss limit schedule signal $h_{SCH}$.

The output from divider 512 controls a gain factor in block 514. If the altitude loss exceeds the scheduled loss limit, gain factor 514 outputs an appropriately predetermined gain factor. This gain factor is applied as a multiplier value to multiplier 516. The operand input to multiplier 516 is provided at the output of summer 518. Inputs to summer 518 are the previously described factor $K\gamma$ selected by switch 432 and the output from a $\Delta\alpha$ program block 520. A value of $\Delta\alpha$ is programmed, as a function of flap position provided at 522, such that the commanded angle of attack will increase to within one degree of stick shaker. Thus, in the event the multiplying factor provided by 514 is nonzero, the multiplier 516 will output a signal $\Delta\alpha'+K\gamma'$ to the summer 434. In this way, the pitch command signal, as produced at the output of combiner 434, is responsive to wind shear or other conditions tending to create an altitude loss, to operate to trade airplane speed for altitude, or, if the aircraft is already near stick shaker, it is prevented from pitching down in an effort to regain speed until it has gained altitude and is out of danger.

In summary, an aircraft flight command and display system has been described in detail. The system includes a thrust command means which controls aircraft thrust on an approach maneuver to compensate for both horizontal and vertical wind components encountered by the aircraft. In addition, wind shear detecting and indicating means produces a two-level warning signal in response to detecting that the aircraft is flying in a wind shear condition. A pitch command means operates during a go-around or takeoff maneuver to produce a pitch command signal adapted to produce optimum aircraft climb, taking into account aircraft altitude.

While preferred embodiments of the invention have been described in detail, it should be understood that many modifications and variations thereto are possible, all of which fall within the true spirit and scope of the invention.

We claim:

1. An aircraft flight command system comprising:
    wind shear detecting and indicating means for producing a warning signal in response to detecting that the aircraft is flying in a wind shear condition;
    thrust command means; operable during an aircraft approach maneuver responsive to aircraft altitude and altitude loss, for producing a thrust command signal for controlling aircraft thrust to compensate for aircraft deviations due to a detected wind shear condition from both a horizontal and a vertial predetermined approach profile; and
    pitch command means, operable in aircraft go-around and takeoff maneuvers responsive to aircraft altitude and altitude loss, for producing a pitch command signal for predeterminedly minimizing aircraft altitude loss in a detected wind shear condition.

2. The system of claim 1 wherein the thrust command means comprises:
    horizontal axis compensating means including:
    (a) means for receiving a signal $V_G$ representative of aircraft groundspeed;
    (b) means for receiving a signal $V_{air}$ representative of aircraft airspeed;
    (c) means for receiving a signal $V_{bug}$ representative of a pilot selected speed;
    (d) means for producing a signal
    $$V_{\epsilon G}=V_{bug}-V_G;$$
    (e) means for producing a signal
    $$V_{\epsilon A}=V_{bug}-V_{air};$$
    (f) means for selecting said $V_{\epsilon F}$ if $V_G<V_{air}$, said means otherwise selecting said $V_{\epsilon A}$ signal;
    (g) means for producing a signal $V_{\epsilon min}$ representative of minimum acceptable aircraft speed independent of wind effect; and
    (h) means for outputting as the hoizontal thrust command signal $\delta T_H$ the greater of the selected $V_{\epsilon G}$ or $V_{\epsilon A}$ signal and the $V_{\epsilon min}$ signal.

3. The system of claim 2 further including:
    means for producing a phugoid damping signal; and means for summing said phugoid damping signal with said horizontal thrust command output signal, to thereby produce a compensated horizontal command signal $\delta T_{HC}$.

4. The system of any one of claims 1, 2 or 3 wherein the thrust command signal comprises:
vertical axis compensating means including:
means for receiving a signal $\dot{h}$ representative of aircraft altitude rate; and
means for producing a vertical thrust command signal $\delta T_V$, with $$\delta T_V = \frac{K_1}{V_{air}} (\dot{h} - K_2 V_{bug})$$

where $K_1$ and $K_2$ are predetermined constants.

5. The system of claim 4 further comprising a summer means for producing a total thrust command signal $\delta T$, where $$\delta T = \delta T_{HC} + \delta T_V.$$

6. The system of claim 1 wherein the wind shear detecting and indicating means comprises:
means for producing a signal $\dot{V}_L$ representative of the longitudinal wind acceleration component in accordance with:

$$\dot{V}_L = \dot{V}_{air} - \dot{V}_{ground},$$

where
$\dot{V}_{air}$ = airspeed rate and
$\dot{V}_{ground}$ = groundspeed rate;
means for producing a signal $\dot{V}_V$ representative of the vertical wind component in accordance with:

$$\dot{V}_V = \left[ (\theta - \alpha) - \frac{\dot{h}}{V_{air}} \right] g,$$

where:
$\theta$ = pitch angle,
$\alpha$ = angle of attack,
$\dot{h}$ = altitude rate, and
$V_{air}$ = airspeed; and
means for summing said $\dot{V}_L$ and $\dot{V}_V$ signals to produce a total wind shear signal $\dot{V}_{WS}$.

7. The system of claim 6 wherein the wind shear detecting and indicating means further comprise:
means for processing wind shear signal $\dot{V}_{WS}$ and producing a signal $\dot{V}_{WS,descent}$ representative of the rate of change of $\dot{V}_{WS}$ in the descent direction; and
means for summing said $\dot{V}_{WS}$ and $\dot{V}_{WS,descent}$ signals to produce a wind shear warning signal.

8. The system of claim 7 wherein the wind shear detecting and indicating means further comprise:
warning logic means for processing said wind shear warning signal and producing:
a first level warning indication responsive to said wind shear warning signal exceeding a first predetermined level, said first predetermined level being selected to correspond to a high but acceptable-for-landing wind shear level; and
a second level warning indication responsive to said wind shear warning signal exceeding a second predetermined level, said second predetermined level being selected to correspond to a wind shear level dictating an aircraft go-around maneuver.

9. The system of claim 1 wherein the pitch command means comprises:
means for producing an angle of attack command signal $\alpha_0$ as a predetermined function of flap position;
means for comparing said $\alpha_0$ signal with a signal $\alpha$ representing actual angle of attack to produce a signal $\alpha_{ERROR}$;
means for predeterminedly processing a signal h representative of altitude and producing a signal $h_{SCH}$ representing a predetermined scheduled altitude loss limit;
means for producing a signal $h_{LOSS}$ representing altitude loss;
means responsive to flap position for producing a signal $\Delta\alpha$ representing an increased angle of attack required to bring the aircraft within a predetermined margin of stick shaker;
means for multiplying said $\Delta\alpha$ signal by a factor $(h_{LOSS}/h_{SCH})$ to produce a signal $\Delta\alpha'$; and
means for summing said $\alpha_{ERROR}$ and $\Delta\alpha'$ to produce a pitch command signal.

10. The system of claim 9 further comprising means for producing phugoid and short term damping signals and summing said signals with said pitch command signal.

11. An aircraft flight command system for producing a command signal to control engine thrust for maintaining an aircraft on an approach profile, the system comprising:
horizontal axis compensating means including:
(a) means for receiving a signal $V_G$ representative of aircraft groundspeed;
(b) means for receiving a signal $V_{air}$ representative of aircraft airspeed;
(c) means for receiving a signal $V_{bug}$ representative of a pilot selected speed;
(d) means for producing a signal $$V_{\epsilon G} = V_{bug} - V_G;$$

(e) means for producing a signal $$V_{\epsilon A} = V_{bug} - V_{air};$$

(f) means for selecting said $V_{\epsilon G}$ if $V_G < V_{air}$, said means otherwise selecting said $V_{\epsilon A}$ signal;
(g) means for producing a signal $V_{\epsilon min}$ representative of minimum acceptable aircraft speed independent of wind effect;
(h) means for outputting as the horizontal thrust command signal $\delta T_H$ the greater of the selected $V_{\epsilon G}$ or $V_{\epsilon A}$ signal and the $V_{\epsilon min}$ signal; and
(i) thrust control means for controlling thrust in response to an output horizontal command signal.

12. The system of claim 11 further including:
means for producing a phugoid damping signal; and
means for summing said phugoid damping signal with said horizontal thrust command output signal, to thereby produce a compensated horizontal command signal $\delta T_{HC}$.

13. The system of either one of claims 11 or 12 wherein the thrust command signal comprises:
vertical axis compensating means including:

means for receiving a signal $\dot{h}$ representative of aircraft altitude rate; and means for producing a vertical thrust command signal $\delta T_V$, $$\delta T_V = \frac{K_1}{V_{air}}(\dot{h} - K_2 V_{bug})$$

where $K_1$ and $K_2$ are predetermined constants.

14. The system of claim 12 further comprising a summer means for producing a total thrust command signal $\delta T$, where $$\delta T = \delta T_{HC} + \delta T_V.$$

15. A system for detecting the condition of an aircraft flying through wind shear, the system comprising:

means for producing a signal $\dot{V}_L$ representative of the longitudinal wind acceleration component in accordance with:

$$\dot{V}_L = \dot{V}_{air} - \dot{V}_{ground},$$

where
$\dot{V}_{air}$ = airspeed rate and
$\dot{V}_{ground}$ = groundspeed rate;

means for producing a signal $\dot{V}_V$ representative of the vertical wind component, in accordance with:

$$\dot{V}_V = g\left[(\theta - \alpha) - \frac{\dot{h}}{V_{air}}\right],$$

where:
$\theta$ = pitch angle,
$\alpha$ = angle of attack,
$\dot{h}$ = altitude rate, and
$V_{air}$ = airspeed;

means for summing said $\dot{V}_L$ and $\dot{V}_V$ signals to produce a total wind shear signal $\dot{V}_{WS}$, and warning logic means for processing said total wind shear signal $\dot{V}_{WS}$ to produce a windshear warning signal and provide a warning indication if said aircraft is flying in a performance limiting wind shear condition, wherein said performance limiting wind shear condition, is determined when $V_{WS}$ exceeds a predetermined level.

16. The system of claim 15 wherein the warning logic means further comprises:

means for producing a signal $\dot{V}_{WS,descent}$ representative of the rate of change of $\dot{V}_{WS}$ in the descent direction; and means for summing said $\dot{V}_{WS}$ and $\dot{V}_{WS,descent}$ signals to produce said wind shear warning signal.

17. The system of claim 16 wheein the warning logic means further comprises means for producing:

a first level warning indication responsive to said wind shear warning signal exceeding a first predetermined level, said first predetermined level being selected to correspond to a high but acceptable for landing wind whear level; and a second warning indication responsive to said wind shear warning signal exceeding a second predetermined level, said second predetermined level being selected to correspond to a wind shear level dictating an aircraft go-around maneuver.

18. An aircraft pitch command system operable in aircraft go-around and takeoff maneuvers comprising:

means for producing an angle of attack command signal $\alpha_0$ as a predetermined function of flap position;

means for comparing said $\alpha_0$ signal with a signal $\alpha$ representing actual angle of attack to produce a signal $\alpha_{ERROR}$;

means for predeterminedly processing a signal h representative of altitude and producing a signal $h_{SCH}$ representing a predetermined scheduled altitude loss limit;

means for producing a signal $h_{LOSS}$ representing altitude loss;

means responsive to flap position for producing a signal representing an increased angle of attack required to bring the aircraft within a predetermined margin of stick shaker;

means for multiplying said $\Delta\alpha$ signal by a factor $(h_{LOSS}/h_{SCH})$ to produce a signal $\Delta\alpha$;

means for summing said $\alpha_{ERROR}$ and $\Delta\alpha$ to produce a pitch command signal and pitch control means for controlling aircraft pitch in response to a produced pitch command signal.

19. The system of claim 18 further comprising means for producing phugoid and short term damping signals and summing said signals with said pitch command signal.

* * * * *